United States Patent [19]
Johnson

[11] 3,939,592
[45] Feb. 24, 1976

[54] EXTENSIBLE TAPE DEVICES

[76] Inventor: Richard D. Johnson, 715 Marcella Road, Des Plaines, Ill. 60016

[22] Filed: Jan. 27, 1975

[21] Appl. No.: 544,328

[52] U.S. Cl. .......................................... 43/15; 46/61
[51] Int. Cl.² ............................................ A01K 97/00
[58] Field of Search ............ 43/15; 46/61; 33/137 R

[56] References Cited
UNITED STATES PATENTS

| | | | |
|---|---|---|---|
| 1,983,202 | 12/1934 | Volz | 33/137 R |
| 2,610,439 | 9/1952 | Nemeth | 46/61 |
| 2,765,535 | 10/1956 | Weber | 33/137 R |
| 2,995,852 | 8/1961 | Szillage | 43/15 |
| 3,399,482 | 9/1968 | Cox | 43/15 |
| 3,545,124 | 12/1970 | Schwartz | 46/61 |

*Primary Examiner*—Louis G. Mancene
*Assistant Examiner*—Daniel J. Leach
*Attorney, Agent, or Firm*—Hill, Gross, Simpson, Van Santen, Steadman, Chiara & Simpson

[57] ABSTRACT

An extensible rollup device comprises an elongated resiliently flexible tape body having a transversely arched bias which maintains the body relatively stiffly extended until bias at one terminal portion is overcome, such terminal portion provided with a utility element which avoids interferring with extensibility and is adapted to be rolled up in the device. The utility element may comprise a hook, a claw, weight, banner, etc. At its opposite terminal portion the body may have a handle. Rollup sensitivity control, rollup timing delay and rollup stop are provided.

14 Claims, 13 Drawing Figures

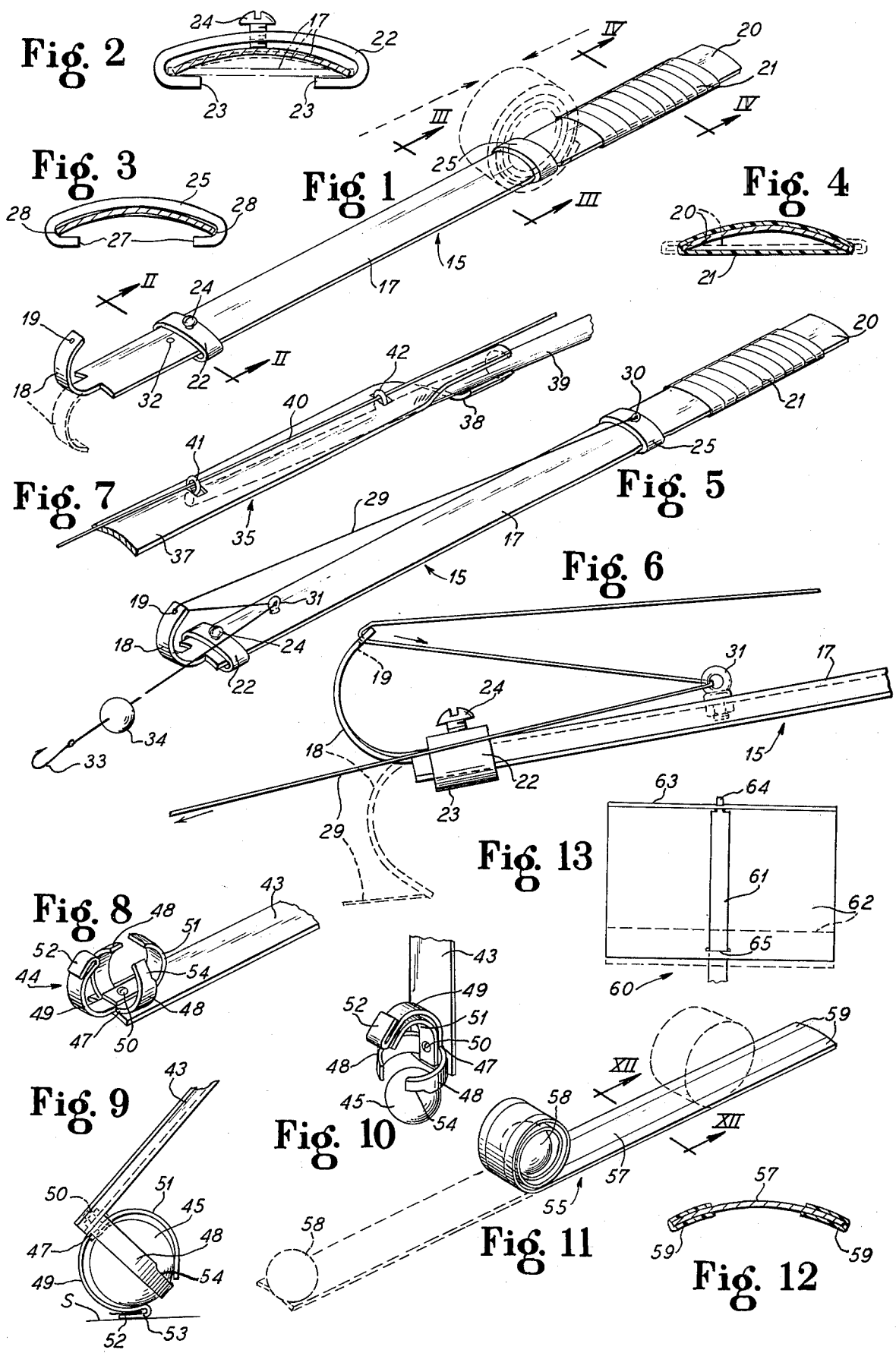

EXTENSIBLE TAPE DEVICES

This invention relates to extensible tape devices, and is more particularly concerned with utilizing rollup tape of the resiliently flexible type having a transversely arched bias and provided on one terminal with a utility element and a handle area at its opposite terminal.

The use of extensible rollup tapes as collapsible rulers is well known. Telescopic and foldable rod-like members for various purposes as well known.

A principle aim of the present invention is to provide an extensible rollup device in which the advantages of rollup compactness and simplicity of construction of rollup tape are adapted for various utilitarian functions requiring a rod-like extension in use.

It is, accordingly, an important object of the present invention to provide a new and improved extensible device provided with utility means at one terminal and handle means at the opposite terminal.

Another object of the invention is to provide a new and improved rollup tape device adapted for numerous and varied utilitarian functions.

A further object of the invention is to provide a new and improved handle means for an extensible rollup tape device.

Still another object of the invention is to provide a new and improved rollup tape device with rollup sensitivity control means.

Yet another object of the invention is to provide a new and improved rollup tape device having novel rollup timing means.

A still further object of the invention is to provide new and improved rollup stop means for a rollup tape device.

According to features of the invention there is provided an extensible rollup device comprising an elongated resiliently flexible tape body having a normal rollup bias, and a transversely arching bias for retaining the body selectively extended in opposition to the rollup bias. Rollup of the extended body is triggered by relatively flattening a terminal portion of the extended tape to overcome the arching bias. A utility element is carried on the terminal portion of the body, in noninterfering relation to functioning of the rollup bias and the arching bias, and adapted to be rolled up within the tape.

Another feature of the invention resides in providing a new and improved handle structure for extensible rollup tape devices.

A further feature of the invention resides in providing new and improved rollup sensitivity control means in extensible rollup tape devices.

A yet further feature of the invention resides in providing rollup timing or delay means for extensible rollup tape devices.

An additional feature of the invention resides in providing new and improved rollup stop means for extensible rollup tape devices.

Other objects, features and advantages of the invention will be readily apparent from the following description of some preferred embodiments thereof, taken in conjunction with the accompanying drawings although variations and modifications may be effected without departing from the spirit and scope of the novel concepts embodied in the disclosure, and in which:

FIG. 1 is an isometric view of one form of the device embodying features of the invention;

FIG. 2 is an enlarged sectional detail view taken substantially along the line II—II of FIG. 1;

FIG. 3 is an enlarged sectional detail view taken substantially along the line III—III of FIG. 1;

FIG. 4 is an enlarged sectional detail view taken substantially along the line IV—IV of FIG. 1;

FIG. 5 is an isometric view of a modification of the device;

FIG. 6 is an enlarged fragmentary side elevational view of the head terminal end portion of the device of FIG. 5;

FIG. 7 is a fragmentary isometric view of another modification of the device;

FIG. 8 is a fragmentary isometric view of the head terminal portion of a further modification of the device;

FIG. 9 is a side elevational view of the device of FIG. 8 demonstrating one particular utility thereof;

FIG. 10 is another view of the device of FIG. 8 showing a further utility thereof;

FIG. 11 is is an isometric view showing yet another modification of the device;

FIG. 12 is an enlarged transverse sectional detail view taken substantially along the line XII—XII of FIG. 11; and FIG. 13 is a plan view of still another modification.

In FIG. 1 there is depicted a representative extensible rollup device 15 embodying features of the invention and including an elongated resiliently flexible tape body 17 of suitable length and width for the intended purpose, having a normal rollup bias and a transversely arched holding bias when straightened out so that it can be rolled up into a compact roll as shown in dash outline, and can be extended into a straight bar-like form as shown in full outline. Rollup of the extended body 17 is adapted to be triggered by relatively flattening a terminal portion of the extended tape to overcome the arching bias. The rollup bias is then automatically effective to rollup the body 17 into a compact helical roll form. Any suitable material having the required spring characteristics may be used. Spring metal may be preferred for reasons of economy.

Carried on one terminal portion of the body 17 and what may be termed the head end portion, is a utility element 18 which may be a separately formed piece attached to the body 17 or, as shown, an extension integral in one piece from the terminal head portion of the body. In this instance, the element 18 comprises a hook which is sufficiently narrow and so located on the longitudinal center of the body at juncture with the body to avoid interfering with functioning of the arching bias, and of a small enough diameter to avoid interfering with functioning of the rollup bias so that the hook 18 is adapted to be rolled up within the tape but will extend effectively from the head end of the tape when the body 17 is extended. This hook element 18 may be utilized for any preferred function such as a grab hook or finger or to have something attached thereto, being for the latter purpose provided adjacent to its distal end or tip with a suitable hole 19. The element 18 may be turned in either direction as shown in full and dash outline in FIG. 1, and may serve as an effective trip or trigger lever in either position to initiate rollup of the body 17.

At its opposite terminal end portion, the body 17 serves as a handle 20 which can be grasped for manipulating the device. To facilitate grasping the handle portion 20, it is desirably provided with means providing a handle cover 21, in a preferred form comprising an elastic tape such as an elastomeric electrician's tape wrapped spiral fashion onto the handle portion. While the elastic tape handle wrapping 21 will hold the handle portion 20 throughout its length against normal tendency toward snapping from the elongated arching bias mode into the rollup mode, when it is desired to roll the handle portion onto the rolled up remainder of the body 17 that can be effected by stretching of the wrapping 21 as indicated in dash outline in FIG. 4 so that the handle portion 20 can go into the rollup mode and be wound onto the wound up or coiled body 17, as indicated in dash outline in FIG. 1.

Means are provided for controlling sensitivity of the body 17 to transition from the arching bias mode to the rollup bias mode. In a desirable form this comprises an arching tension control or modulator member 22 of substantially rigid structure and conveniently comprising an arched metal band of a length to extend across the body 17 and having return bent or looped terminals 23 (FIG. 2) at its opposite ends and directed toward one another in spaced opposition. The radius of the member 22 and the spacing of the retaining terminals 23 from the body of the member are such that the body 17 can be received within the member 22 in fully biased transversely arched relation, and the spacing between the insides of the loops defined by the underturned terminals 23 in such that the tape body 17 can flatten out completely for rollup when desired. Control over the sensitivity of the body 17 to translation from the arching bias mode to the rollup bias mode is effected by means carried by the member 22, conveniently in the form of a pressure applying screw 24 threadedly mounted centrally in the body of the member 22 and adapted to be adjusted for pressing against the tape body 17 in opposition to its transverse arching bias to any incremental degree desired within a range from maximum resistance to translation from the arching bias mode to extreme sensitivity wherein even a slight counterforce on the head terminal portion of the body will cause it to snap into the rollup mode. In FIG. 2 the maximum resistance to translation is indicated by a full line showing and adjusted more sensitive relationship attained by adjustment of the set screw 24 is indicated in dash outline. By adjusting the position of the sensitivity control member longitudinally along the head terminal portion of the body 17, sensitivity to pressure applied through the element 18 can be adjusted throughout a wide range.

Means are provided for controlling the extent of rollup of the body 17 relative to the handle portion 20. Herein such means comprise a constrictor 25 (FIGS. 1 and 3) in the form of a rigid band conforming in arched shape to the maximum arched bias of the body 17 and having underturned terminals 27 providing respective opposed loops 28 within which the edges of the tape body 17 are engaged to hold the tape against flattening and thereby maintaining the arching bias at the point of engagement of the member 25 with the body 17. Thus by having the constrictor 25 adjacent to the handle portion 20, rollup of the body 17 will be stopped at the constrictor. However, because the constrictor is in the form of a narrow band, the handle 20 can be wound onto the rolled up body 17 stopped at the constrictor 25. By shifting the constrictor 25 longitudinally along the body 17, the point at which rollup is to be stopped can be selected. For a short rollup the constrictor 25 will be shifted toward the head end of the body 17. For a longer rollup the constrictor 25 can be shifted closer to the handle portion 20.

On reference to FIGS. 5 and 6, an adaptation of the device 15 for use as a fishing aid is demonstrated. For this purpose, a fishing line 29 is anchored at one end to the constrictor stop 25 as by means of an anchoring eye 30 on the stop member. Thence the fish line extends forwardly and is threaded reversely through the hole 19 in the terminal hook 18 and then passes through an eye member 31 secured to the body 17 on the longitudinal center thereof, a hole 32 (FIG. 1) being provided for this purpose spaced a suitable distance rearwardly from the hook element 18. From the eye 31, the line 29 extends forwardly past the hook 18 and is provided at its distal end with means such as a fishhook 33 and at a suitable point above the fishhook with a float 34. Fishing is accomplished in the usual manner using the device 15 as a fishpole, either holding the handle portion 20 in hand or setting it in a holder. When a fish strikes it on the fishhook 33, tension on the line 29 is felt at the tip of the trip level 18 which is pulled inwardly and acts as a trigger to initiate rollup of the body 17 first relaxing the line as the lever 18 retreats toward the eye 31 and then after a short time interval jerking the line and setting the fishhook. Sensitivity of the trigger action can be controlled by means of the arching tension modulator 22. A similar but shorter timed snap release and hook setting jerk action may be attained by securing the fish line 29 to the tip portion of the reversely turned trip lever 18 as shown in dash line in FIG. 6, wherein outward pull on the line by a striking fish trips the lever and triggers rollup, momentarily relaxing the line as the lever 18 swings outwardly and then jerking the line as the lever snaps into the rollup.

For fishing convenience, where it is desired to have a more rigid pole arrangement for handling purposes, and relying on the rollup device primarily as a strike sensitive hook setting medium, the arrangement shown in FIG. 7 may be employed. This comprises a device 35 including an elongated resiliently flexible tape body 37 having on its head end a fish line actuated trigger arrangement the same as described for the device 15 in FIGS. 5 and 6, but provided on its rear terminal portion with an integral ferrule-like structure 38 by which the device is attached as an extension on a pole 39. In this instance a fish line 40 extends through guide eyes 41 and 42 on the body 37 to a desired point on the pole 39 such as a reel or anchor (not shown). Similarly as described with respect to the device in FIGS. 5 and 6, a strike triggers the device 35 to snap from the extended mode to the rollup mode, thereby setting the hook.

In FIGS. 8, 9 and 10, an arrangement is exemplified wherein an elongated resiliently flexible tape body 43 having the same characteristics as the body 17 is provided with a utility element in the form of a claw structure 44 adapted to receive a ball shaped member 45 such as a golfball. For this purpose, the claw structure 44 comprises one part 47 with three integral cooperatively arranged curved fingers comprising a pair of opposed fingers 48 and an intermediate finger 49. Attachment of the claw 44 to the head terminal portion of the body 33 is by means of a bolt 50 adapted to secure the member 47 in any swivelly adjusted position desired on the convex side of the body 43 at its longitudinal center without interfering with arching or rollup bias of the body. A fourth claw finger 51 is secured in assembly with the member 47 by means of the bolt 50. Through this arrangement, the claw fingers 48, 49 and 51 can cooperate to provide a cage for retaining the ball member 45 therein as a weight. Thereby the device may be employed as a yo yo-like, snap-out and snap-back toy.

Means may be provided equipping the device to serve as a cap firing percussion device or noise maker. For this purpose the finger 49 is provided with an outturned reverse bent gripper flange 52 so that an explosive powder cap 53 inserted within the jaw provided by the flange 52 can be detonated by striking the flange 52 against a surface S (FIG. 9) with the ball 45 providing a weight affording the necessary detonating thrust when the detonator strikes the surface S.

To permit use of the device as a golfball retriever, as shown in FIG. 10, the finger 51 is turned into the claw into nested relation within the finger 49, whereby the claw fingers 48 provide an opening through which the golfball 45 can be received into the claw. In order to facilitate entry of the golfball into the claw, the leading edges of the fingers 48 are relieved as shown at 54, and the fingers 48 are biased resiliently toward one another with a clearance slightly undersize relative to the diameter of the ball 45. Thereby, with the opening into the claw provided between the fingers 48, as shown in FIG. 10, thrusting of the device axially toward the golfball 45 will receive the golfball in the claw so that the ball can then be lifted, as for example by causing the body 43 to translate into the rollup mode from the extended mode. Thereby the device can serve as a golfball retriever from waterholes, or as a retriever and pick up for persons having difficulty in stooping over to pick up a ball from the ground. By virtue of its capability of rolling into a compact unit, the device can be easily stored in a golfbag or carried in the user's pocket.

Having reference to FIG. 11, a device 55 according to features of the invention has an elongated resiliently flexible tape body 57 having a normal rollup bias, and a transversely arching bias for retaining the body selectively extended in opposition to the rollup bias and which is adapted to be manipulated from a rolled up condition into an extended condition wherein a utility element 58 attached to its head terminal end is fully extended from the opposite or handle terminal end. In this instance the element 58 may be merely a weight to facilitate selective extension of the device 55 from its rolled up condition. In this instance, as in each of the other forms of the device described, the element 58 is carried by the terminal of the body 57 on the convex side so that in the rollup mode the element 58 is rolled up within the body. In order to improve a yo-yo action for the device 55, rollup sensitivity control means are desirably provided in the form of side edge resiliently flexible binding 59 (FIGS. 11 and 12) which is desirably in the form of elastomeric tape secured as by means of adhesive bonding along each longitudinal margin of the body 57 but leaving the major extend of the body free. Thereby the arching bias of the body is uneffected, but the rollup bias is controlled and modulated to be at a slower rate than where the body 57 is free from the modulating means. By having the modulating tape 59 along the entire length of the body 57, a uniformly modulated slowing of the rollup action is attained. Such action can be modified by the width of the modulating tape 59 and the length along with the tape is applied to the body 57. For example, if the modulating tapes 59 are applied to only the rear half of the body 57, then there will be a rapid initial rollup action with slow down as the rollup reaches and includes the modulating tape 59. By varying the width and thickness of the modulating tape 59, numerous and varied actions can be attained. By proper selection of the material, weight and extend of coverage of the margins of the body 57 timed rollup is attainable. By utilizing a binding such as the handle wrap binder 21 at any point along the body of the device or throughout any length thereof, timing control of rollup can be even more effectively attained.

In FIG. 13 is exemplified another use for the present invention, comprising a device 60 provided with an elongated resiliently flexible tape body 61 having a normal rollup bias, and a transversely arching bias for retaining the body selectively extending in opposition to the rollup bias and serving in extended mode as a standard for a banner 62, convenient for mobile advertising displays, athletic contest demonstrations, cheerleader accessory, convention and street demonstration placard device, etc. In a simple construction, the placard 62 comprises a suitable size sheet member such as paper carrying a desired inscription on either or both sides thereof and may have a light weight headbar 63 on its upper end with which a utility element central tab extension 64 on the head terminal of the body 61 is retainingly engaged, and means such as a slot 65 in the opposite or lower end portion of the placard 62 being provided for engagement therethrough of the body 61. The body 61 may be as long as desired for convenience in hoisting the placard 62 and may be provided with a handle similar to the handle portion 20 of FIG. 1 for convenient handling, rollup modulating means such as the edge strips 59 of FIG. 11, or the like. By virtue of the selectively extensible rollup body 61, the placard 62 can be conveniently rolled as indicated in dash outline for convenient handling in collapsed form and for storage, can be quickly and easily erected, and can be quickly and easily rerolled, as desired, by simply extending the body 61 or permitting it to roll up.

It will be understood that variations and modifications may be effected without departing from the spirit and scope of the novel concepts of this invention.

I claim as my invention:

1. An extensible rollup device, comprising:
   an elongated resiliently flexible tape body having a normal rollup bias, and a transversely arching bias for retaining the body selectively extended in opposition to said rollup bias;
   rollup of the extended body being triggered by relatively flattening a terminal portion thereof to overcome the arching bias; and
   a utility element carried on said terminal portion, in noninterfering relation to functioning of said rollup bias or said arching bias, and adapted to be rolled up within the tape.

2. A device according to claim 1, wherein the opposite end portion of said body provides a manipulating handle.

3. A device according to claim 2, wherein said handle has a wrap of rollup resisting material.

4. A device according to claim 1, wherein the opposite terminal portion of said body has means receptive of a rod member.

5. A device according to claim 1, wherein said body has means along at least a portion of its edge for modulating rollup.

6. A devide according to claim 1, including rollup sensitivity controlling means carried by said body adjacent to said utility element.

7. A device according to claim 1, including rollup stop means carried by said body intermediate its ends.

8. A device according to claim 1, wherein said utility element comprises an integral extension from said terminal portion, said extension being substantialy narrower than the width of the body and providing a trip lever for initiating rollup.

9. A device according to claim 1, provided with means adapting the device to serve as a fishing accessory, said utility element providing a trip lever for triggering rollup in response to fish line tension.

10. A device according to claim 9, including fish line guide eye means carried by said body spaced from said utility element.

11. A device according to claim 9, wherein said utility element comprises a lever extension turned relative to the face plane of the extended body and having a tip provided with means for connection with a fish line for trigger-responsiveness of the lever to fish line tension.

12. A device according to claim 1, wherein said utility element comprises a structure formed separately from said body and attached to said terminal portion.

13. A device according to claim 12, wherein said structure comprises a ball retainer.

14. A device according to claim 1, wherein said utility element comprises a percussion instrument.

* * * * *